No. 728,946. PATENTED MAY 26, 1903.
H. H. V. LILLEY, DEC'D.
J. L. LILLEY, ADMINISTRATOR.
CLAMP LATHE DOG.
APPLICATION FILED JULY 25, 1902.
NO MODEL.
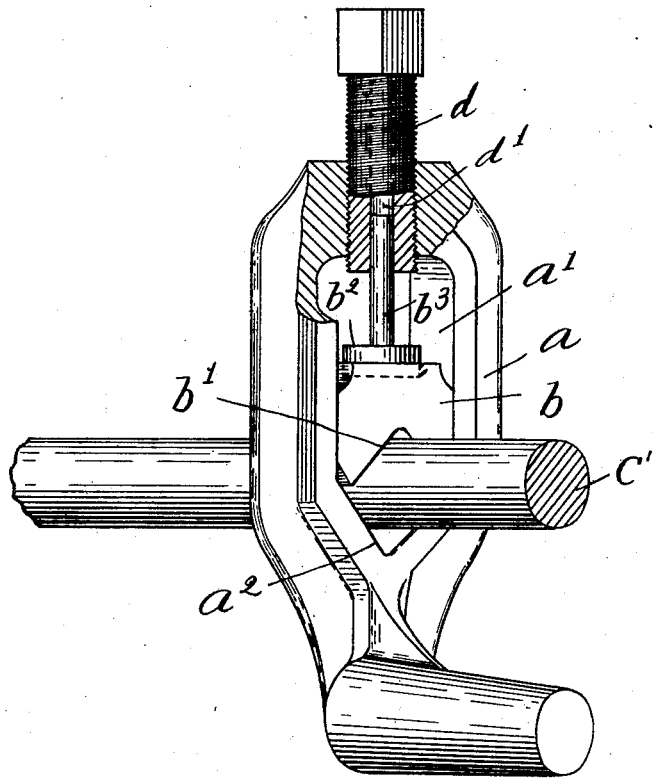
Witnesses:
H. B. Davis
Maud M. Piper
Inventor:
James L. Lilley
Administrator of Estate of
Hugh H. V. Lilley, dec'd.
by Bryson Harriman,
Attys.

No. 728,946. Patented May 26, 1903.

UNITED STATES PATENT OFFICE.

JAMES L. LILLEY, OF MILFORD, MASSACHUSETTS, ADMINISTRATOR OF HUGH H. V. LILLEY, DECEASED, ASSIGNOR, BY MESNE ASSIGNMENTS, TO SAID JAMES L. LILLEY.

CLAMP LATHE-DOG.

SPECIFICATION forming part of Letters Patent No. 728,946, dated May 26, 1903.

Application filed July 25, 1902. Serial No. 116,962. (No model.)

*To all whom it may concern:*

Be it known that HUGH H. V. LILLEY, deceased, late of Milford, county of Worcester, State of Massachusetts, did invent an Improvement in Clamp Lathe-Dogs, of which the following description, in connection with the accompanying drawings, is a specification, like characters on the drawings representing like parts.

This invention relates to clamp lathe-dogs, and has for its object to improve the construction of the same to the end that they can be used on rough or finished work without marring it and also on threaded work without injuring the threads, and, furthermore, is adapted to hold the work with a much firmer grasp than the ordinary clamp lathe-dog now in common use and is more durable and always ready for use.

The drawing shows a perspective view, partly broken away, of a clamp lathe-dog embodying this invention, the part being shown in position to loosely engage the work, (the set-screw not being screwed down.)

$a$ represents the main body of the dog, having a work-receiving opening $a'$ and having at the bottom of said opening a V-shaped portion $a^2$, adapted to present two points for engagement with the work. A work-engaging block $b$ is provided, which is made of suitable size and shape to fit loosely within the work-receiving opening $a'$ and to move up and down therein easily. The work-engaging block $b$ is formed with an inverted-V-shaped recess $b'$, which forms two work-engaging points, so that when the work, which is herein represented as a rod or bar $c'$, is placed in the work-receiving opening it will be engaged at four points, and thereby very firmly held. The work-engaging block $b$ is made of soft metal, so as not to mar the work, even though the work be threaded. A hard-metal washer or plate $b^2$ is cast into or otherwise connected to the block $b$, which provides a hard surface for engagement of the end of the set-screw $d$, so that said set-screw may be screwed down as hard as desired. The top of the washer or plate is made flat and the lower end of the set-screw is also made flat, so that the two flat or plane surfaces will be brought together when the set-screw is screwed down, and as a result the set-screw in not jammed or bent by repeated use. The washer or plate is preferably made larger in diameter, or, at least, as large as the set-screw.

The work-engaging block $b$ has secured to it a spindle or stem $b^3$, which projects up into a socket $d'$ in the set-screw $d$, which latter is screwed into the body $a$. The stem $b^3$ loosely fits the socket in the set-screw and is made long enough to slightly enter said socket when the work is removed and the block drops to the bottom of the opening in the body, thereby preventing the block being easily removed and lost.

Having thus described the invention, what is claimed for Letters Patent is—

1. A clamp lathe-dog comprising a body having a work-receiving opening, a set-screw having a socket, a work-engaging block contained in said opening adapted to be engaged by said set-screw and having a stem which is freely slidable in the socket in said set-screw, substantially as described.

2. A clamp lathe-dog comprising a body having a work-receiving opening formed V-shaped at the bottom, a set-screw having a socket, a work-engaging block contained in said opening adapted to be engaged by said set-screw and formed with an inverted-V-shaped recess and having a stem which is freely slidable in the socket in said set-screw, substantially as described.

3. A clamp lathe-dog comprising a body having a work-receiving opening, a set-screw having a socket, a work-engaging block contained in said opening having on its side opposite its work-engaging face a flat-faced washer or plate against which the flat-faced end of the set-screw bears, and also having a stem which is freely slidable in the socket in said set-screw, substantially as described.

In testimony whereof I have signed my name to this specification in the presence of two subscribing witnesses.

JAMES L. LILLEY,
*Administrator of the estate of Hugh H. V. Lilley, deceased.*

Witnesses:
ADA B. KELLEY,
WILLIAM A. HUSSEY.